(12) United States Patent  (10) Patent No.: US 8,123,377 B2
Lundberg et al.  (45) Date of Patent: Feb. 28, 2012

(54) SYSTEMS AND METHODS FOR AIRCRAFT LED ANTI COLLISION LIGHT

(75) Inventors: John Lundberg, Springfield, OH (US); Jeffrey M. Singer, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 180 days.

(21) Appl. No.: 12/194,209

(22) Filed: Aug. 19, 2008

(65) Prior Publication Data

US 2010/0046241 A1  Feb. 25, 2010

(51) Int. Cl.
*F21V 13/00* (2006.01)
(52) U.S. Cl. ............... 362/243; 362/249.02; 362/545
(58) Field of Classification Search .......... 362/538, 362/543–545, 227, 235, 346–348, 241, 355, 362/341, 343, 249.02, 243, 470
See application file for complete search history.

(56) References Cited

U.S. PATENT DOCUMENTS

| | | | | |
|---|---|---|---|---|
| 4,992,704 | A * | 2/1991 | Stinson | 315/312 |
| 5,561,346 | A * | 10/1996 | Byrne | 313/512 |
| 6,814,475 | B2 * | 11/2004 | Amano | 362/487 |
| 6,846,099 | B2 | 1/2005 | Dubin et al. | |
| 6,879,263 | B2 | 4/2005 | Pederson et al. | |
| 6,963,293 | B1 | 11/2005 | Rast | |
| 6,976,775 | B2 * | 12/2005 | Koike | 362/545 |
| 7,046,160 | B2 | 5/2006 | Pederson et al. | |
| 7,079,041 | B2 | 7/2006 | Fredericks et al. | |
| 7,134,775 | B2 * | 11/2006 | Oishi et al. | 362/545 |
| 7,163,327 | B2 | 1/2007 | Henson et al. | |
| 7,236,105 | B2 | 6/2007 | Brenner et al. | |
| 7,306,352 | B2 * | 12/2007 | Sokolov et al. | 362/341 |
| 7,360,924 | B2 | 4/2008 | Henson et al. | |
| 2004/0037088 | A1 * | 2/2004 | English et al. | 362/545 |
| 2004/0213014 | A1 * | 10/2004 | Koike | 362/545 |
| 2004/0223338 | A1 * | 11/2004 | Koike et al. | 362/545 |
| 2005/0047167 | A1 | 3/2005 | Pederson et al. | |
| 2005/0057941 | A1 | 3/2005 | Pederson et al. | |
| 2005/0110649 | A1 | 5/2005 | Fredericks et al. | |
| 2006/0007012 | A1 | 1/2006 | Machi et al. | |
| 2006/0007013 | A1 | 1/2006 | Singer et al. | |
| 2006/0238368 | A1 | 10/2006 | Pederson et al. | |
| 2007/0164875 | A1 | 7/2007 | Fredericks et al. | |
| 2007/0189015 | A1 * | 8/2007 | Chang et al. | 362/341 |
| 2008/0136661 | A1 | 6/2008 | Pederson et al. | |
| 2009/0097247 | A1 * | 4/2009 | Tseng et al. | 362/241 |
| 2009/0097258 | A1 * | 4/2009 | Tseng et al. | 362/296.05 |

* cited by examiner

*Primary Examiner* — Julie Shallenberger
(74) *Attorney, Agent, or Firm* — Lowe Graham Jones PLLC

(57) ABSTRACT

Aircraft anti-collision light (ACL) systems and methods are operable to emit light from light emitting diode (LED) lamps. An exemplary embodiment includes a housing, a plurality of LED lamps within the housing and configured to emit light in a direction substantially perpendicular to the direction of light emitted from the ACL, and a reflector within the housing that is configured to reflect the light received from the plurality of LED lamps in the direction of light emitted from the ACL.

15 Claims, 4 Drawing Sheets

SYSTEMS AND METHODS FOR AIRCRAFT LED ANTI COLLISION LIGHT

BACKGROUND OF THE INVENTION

Conventional anti-collision lights (ACLs) for aircraft employ xenon flash tube lamps that provide a high intensity, short duration burst of light. A power supply charges one or more capacitors. The charged capacitors provide a relatively high supply voltage to operate the xenon flash tube lamps.

However, capacitor life is limited, and accordingly, they require periodic replacement. Further, life of a xenon flash tube lamp is relatively limited, and accordingly, they also require periodic replacement. Since the life expectancies of the capacitors and the xenon flash tube lamps are different, several rounds of periodic maintenance may be required to ensure reliable operational life expectancies for all components of the ACL. Thus, maintenance costs may be relatively high for a conventional xenon flash tube ACL.

Light emitting diode (LED) technology has developed to a level where a plurality of LEDs, residing in a suitable housing, may be used to replace an ACL employing conventional xenon flash tube technology. However, relatively large arrays of LED lamps are required to generate the required high intensity, short duration burst of light that must be emitted from an ACL.

Further, the direction of emitted light from a LED fixture must be controllable to a predefined range, such as an arc of 110° oriented about a particular predefined directional axis. Such LED fixtures employ a plurality of LED lamps that emit light in a predefined output direction. In such LED fixtures, the LED lamp light output is parallel to the light output direction of the LED fixture. Further, each LED lamp required its own optics, such as an individual reflector, lens, or the like.

In view of the LED lamp configurations where the LED lamp light orientation is parallel to the light output direction of the LED fixture, the LED fixture enclosure dimensions are not compatible with legacy xenon flash tube lamp fixtures. Accordingly, such LED fixtures can not be easily adapted to replace a xenon flash tube lamp enclosure on an existing installation aircraft.

SUMMARY OF THE INVENTION

Systems and methods of emitting light from a plurality of light emitting diode (LED) lamps in an aircraft anti-collision light (ACL) are disclosed. An exemplary embodiment includes a housing, a plurality of LED lamps within the housing and configured to emit light in a direction substantially perpendicular to the direction of light emitted from the ACL, and a reflector within the housing that is configured to reflect the light received from the plurality of LED lamps in the direction of light emitted from the ACL.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
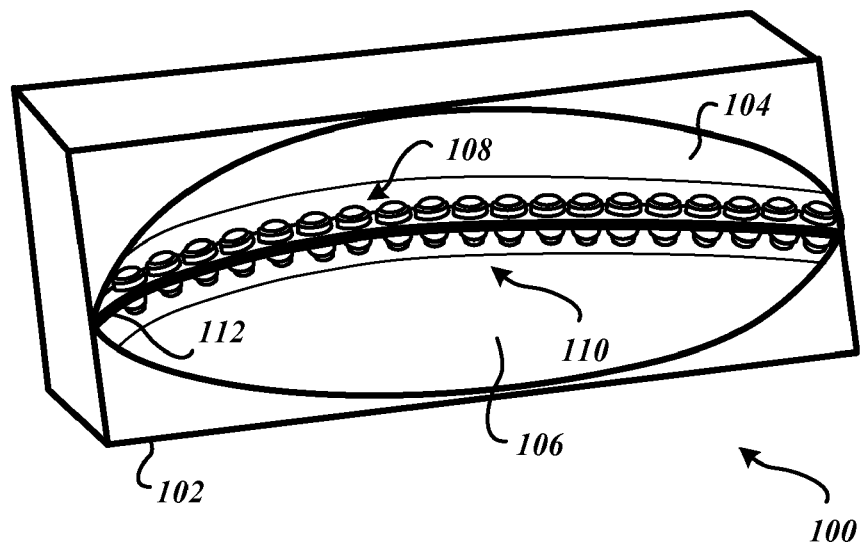
FIG. 1 is a perspective view of a first embodiment of a light emitting diode (LED) aircraft anti-collision light (ACL)
Figure 2:
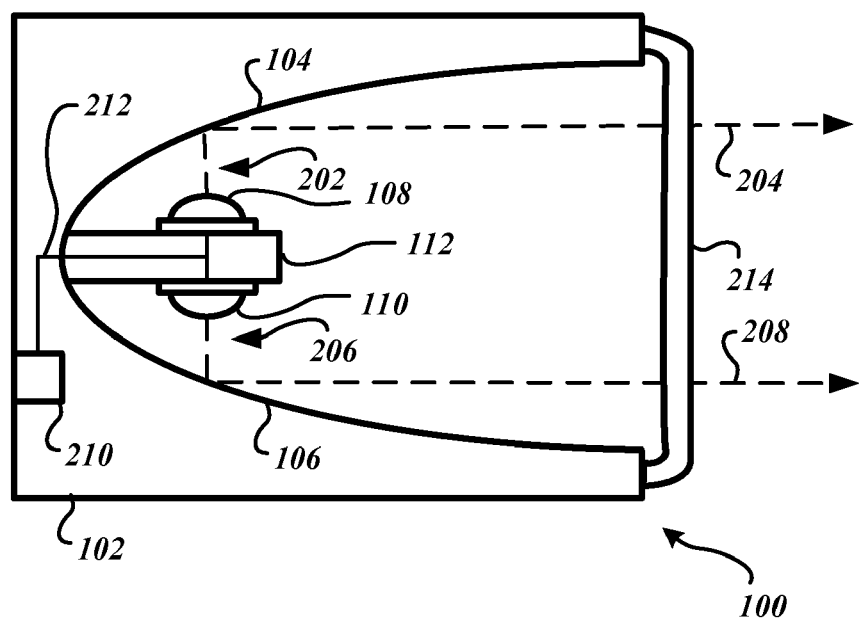
FIG. 2 is cross sectional view of the first embodiment of the LED aircraft ACL.

FIG. 1 is a perspective view of a first embodiment of a light emitting diode (LED) aircraft anti-collision light (ACL) 100. The ACL 100 comprises a housing 102, a first reflector 104, a second reflector 106, a first plurality of LED lamps 108, a second plurality of LED lamps 110, and a support 112. FIG. 2 is cross sectional view of the first embodiment of the LED aircraft ACL 100.

The first reflector 104 and the second reflector 106 are oriented facing towards each other in the exemplary ACL 100. The first plurality of LED lamps 108 are mounted on a first side of the support 112. The second plurality of LED lamps 110 are mounted on an opposing second side of the support 112. Accordingly, the first plurality of LED lamps 108 are facing away from the second plurality of LED lamps 110.

In the exemplary embodiment illustrated in FIGS. 1 and 2, the first plurality of LED lamps 108 are arranged in a single row in an arc corresponding to the perimeter of the first reflector 104. Similarly, the second plurality of LED lamps 110 are arranged in a single row in an arc corresponding to the perimeter of the second reflector 106. By controlling the angle of reflection, the reflectors 104, 106 may be optimally designed to maximize light output from the ACL 100 in a controlled angle about a predefined direction. In alternative embodiments, multiple rows or arrays of LEDs may be used.

The first plurality of LED lamps 108 are oriented so as to emit light, out along a path 202, onto the first reflector 104. The first reflector 104 reflects the emitted light out from the ACL 100 along a path 204. Similarly, the second plurality of LED lamps 110 are oriented so as to emit light, out along a path 206, onto the second reflector 106. The second reflector 106 reflects the emitted light out from the ACL 100 along a path 208. Accordingly, the direction of light emitted from the first plurality of LED lamps 108 and the second plurality of LED lamps 110 is approximately, or substantially, perpendicular to the direction that the ACL 100 emits light.

A connector 210 resides on an outer surface of the housing 102 at a convenient location. A connection 212 connects the first plurality of LED lamps 108 and the second plurality of LED lamps 110 to a power source (not shown) that is electrically coupled to the connector 210.

In embodiments adapted to replace conventional xenon flash tube lamp ACL fixtures, the connector 210 is located at the same location that is used by a conventional xenon flash tube lamp ACL fixture. The connector 210 may be configured to mate with the existing connections of the power source connectors built into the aircraft. Thus, when the housing 102 corresponds to the xenon flash tube ACL fixture, such embodiments of the ACL 100 can be used to conveniently replace conventional xenon flash tube ACL fixtures. A retrofit or replacement of the conventional xenon flash tube ACL fixture may require changing of the power source, and may require elimination of the capacitors used to provide the relatively high source voltage to the xenon flash tube lamps. However, in some retrofit applications, the existing connectors between the ACL 100 power source (not shown) and the ACL 100 retrofit unit may be used to provide the electrical coupling. That is, the wiring within the aircraft may not need to be replaced when the aircraft is retrofit with a replacement ACL 100.

The support 112 may be configured as a heat sink to facilitate the dissipation of heat generated by the first plurality of LED lamps 108 and the second plurality of LED lamps 110. Additionally, or alternatively, the support 112 may be a detachable support for removal from the housing 102 so that the first plurality of LED lamps 108 and the second plurality of LED lamps 110 may, as a group, be removed for service and/or replacement. Alternatively, or additionally, the entire housing 102 may be removed for service and/or replacement.

A transparent cover 214 may be used to cover the first reflector 104, the second reflector 106, the first plurality of LED lamps 108, and the second plurality of LED lamps 110, to provide protection from the environment. Thus, moisture and/or contaminates can be kept away from the internal components, thereby keeping them clean and moisture free for optimal performance. In some embodiments, the cover 214 is configured with one or more lens to modify the light that is output from the ACL 100.

Figure 3:
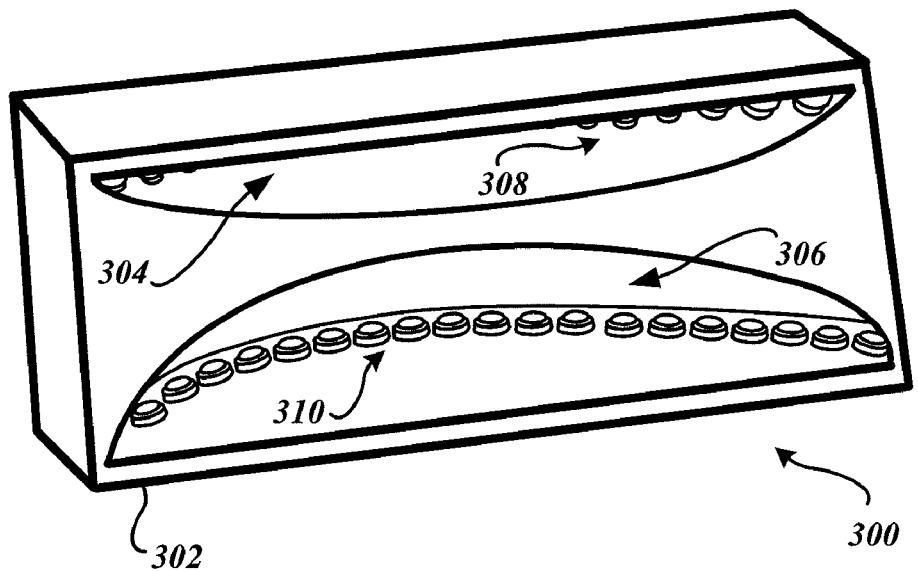
FIG. 3 is a perspective view of a second embodiment of the LED aircraft ACL.
Figure 4:
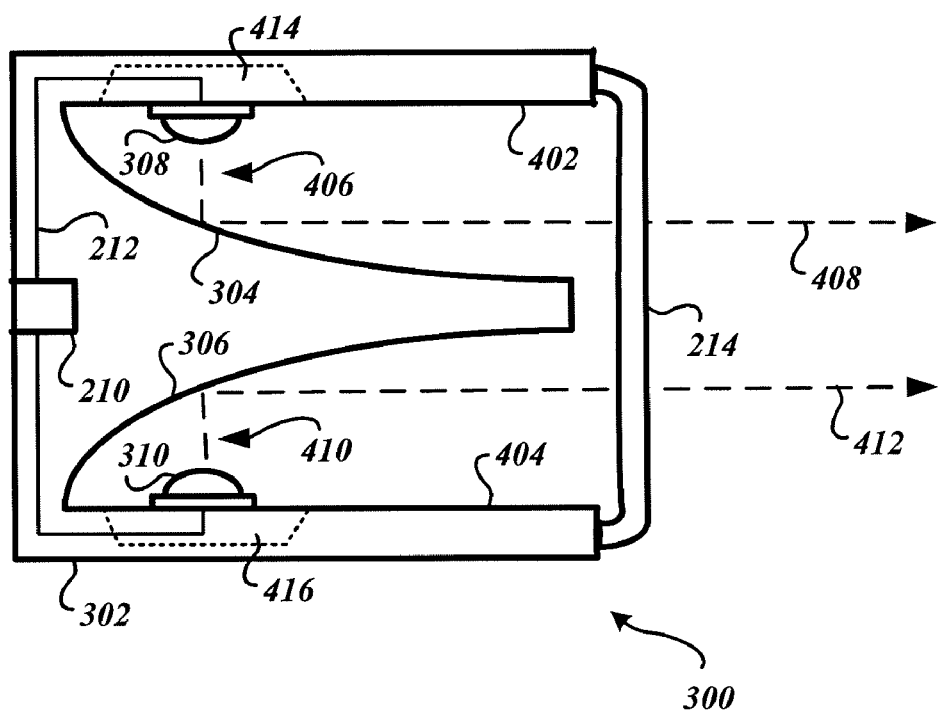
FIG. 4 is cross sectional view of the second embodiment of the LED aircraft ACL.

FIG. 3 is a perspective view of a second embodiment of an ACL 300. The ACL 300 comprises a housing 302, a first reflector 304, a second reflector 306, a first plurality of LED lamps 308, a second plurality of LED lamps 310, and the above described cover 214. FIG. 4 is cross sectional view of the second embodiment of the ACL 300

The first reflector 304 and the second reflector 306 are oriented facing away from each other, in a back-to-back manner. The first plurality of LED lamps 308 are mounted on a first side 402 of the housing 302. That is, the first reflector 304 and the second reflector 306 reside in a central region of the housing 302 and are oriented in opposing directions. The second plurality of LED lamps 310 are mounted on second side 404 of the housing 302. The first plurality of LED lamps 308 and the second plurality of LED lamps 310 are facing towards each other.

In the exemplary embodiment illustrated in FIGS. 3 and 4, the first plurality of LED lamps 308 and the second plurality of LED lamps 310 are arranged in a single row in an arc corresponding to the perimeter of their respective reflector. The reflectors 304, 306 may be optimally designed to maximize light output from the ACL 300. In alternative embodiments, multiple rows or arrays of LEDs may be used.

The first plurality of LED lamps 308 are oriented so as to emit light, out along a path 406, onto the first reflector 304. The first reflector 304 reflects the emitted light out from the ACL 300 along a path 408. Similarly, the second plurality of LED lamps 310 are oriented so as to emit light, out along a path 410, onto the second reflector 306. The second reflector 306 reflects the emitted light out from the ACL 300 along a path 412. Accordingly, the direction of light emitted from the first plurality of LED lamps 308 and the second plurality of LED lamps 310 is in a direction that is approximately, or substantially, perpendicular to the direction that the ACL 300 emits light.

The first side 402 and the second side 404 of the housing 302 may be configured as a heat sink to facilitate the dissipation of heat generated by the first plurality of LED lamps 308 and the second plurality of LED lamps 310. Additionally, or alternatively, a detachable support portion 414 of the first side 402 and a detachable support portion 416 of the second side 404 may be configured for removal from the housing 302 so that the first plurality of LED lamps 308 and/or the second plurality of LED lamps 310 may be removed for service and/or replacement. Alternatively, or additionally, the entire housing 302 may be removed for service and/or replacement.

Further, the housing 302 and the housing 102 (FIGS. 1 and 2), and the components therein, may be interchangeable with each other.

Figure 5:
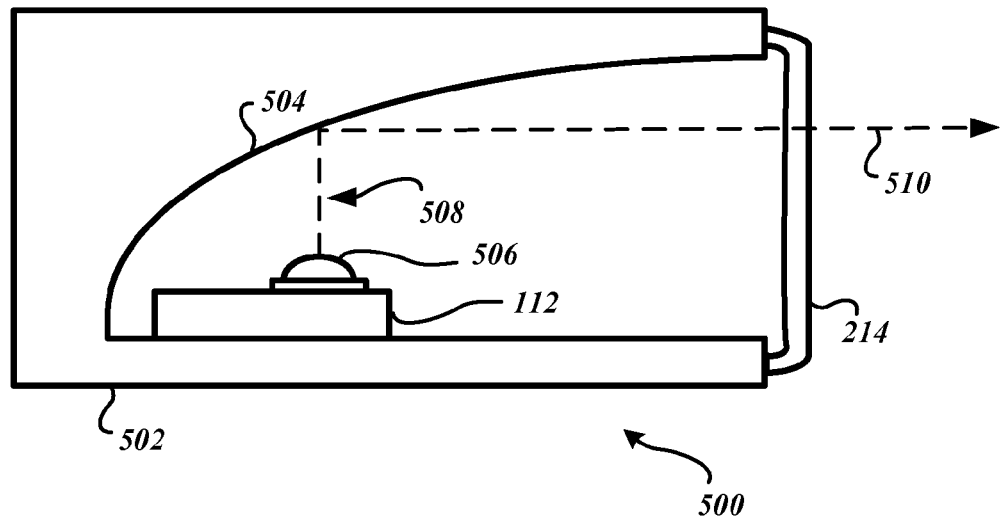
FIG. 5 is cross sectional view of a third embodiment of the LED aircraft ACL.

FIG. 5 is cross sectional view of a third embodiment of the LED aircraft ACL 500. The ACL 500 comprises a housing 502, a reflector 504, a plurality of LED lamps 506, and a support 112. The plurality of LED lamps 506 are arranged in a single row in an arc corresponding to the perimeter of the reflector 504. The plurality of LED lamps 506 are oriented so as to emit light, out along a path 508, onto the reflector 504. The reflector 504 reflects the emitted light out from the ACL 500 along a path 510. Accordingly, the direction of light emitted from the plurality of LED lamps 506 is approximately, or substantially, perpendicular to the direction that the ACL 500 emits light.

Figure 6:
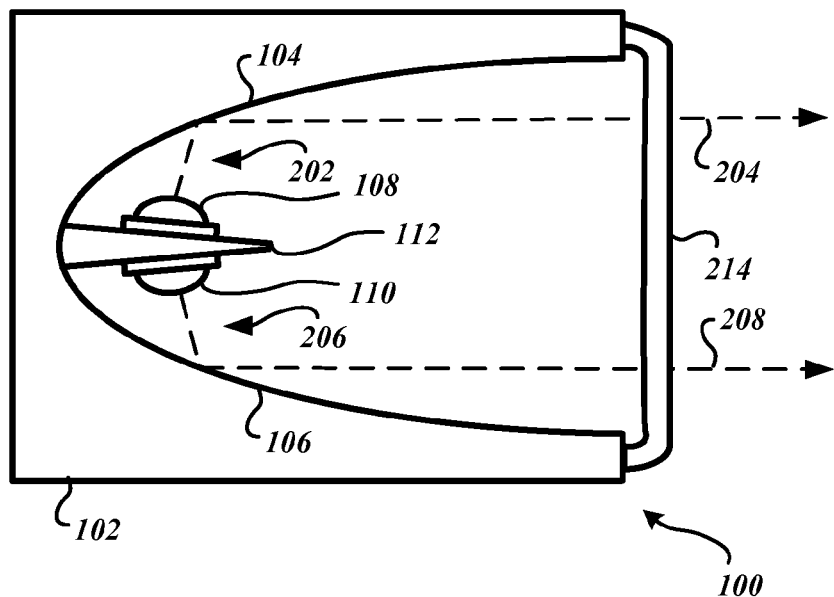
FIG. 6 is cross sectional view of a fourth embodiment of the LED aircraft ACL.

FIG. 6 is cross sectional view of a fourth embodiment of the LED aircraft ACL 600. The ACL 600 comprises a housing 102, a first reflector 104, a second reflector 106, a first plurality of LED lamps 108, a second plurality of LED lamps 110, and a support 112. In this embodiment, the sides of the support 112 where the LED lamps are mounted are not parallel with each other. Thus, the paths 202 and 206 are not precisely perpendicular to the respective paths 204, 208. However, the paths 202, 206 are generally perpendicular, or substantially perpendicular, to the respective paths 204, 208.

Figure 7:
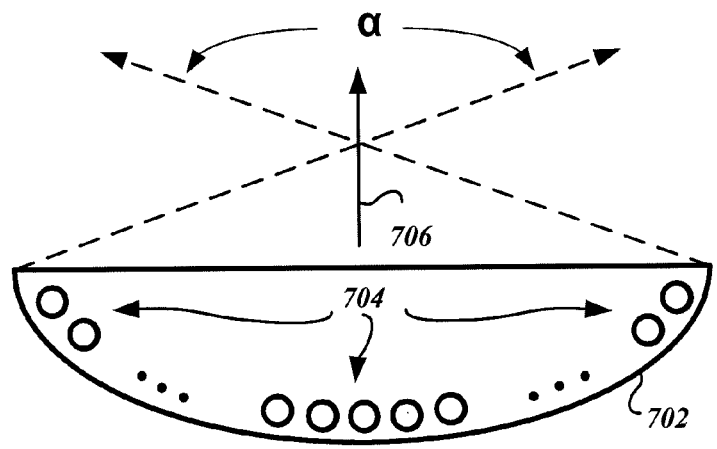
FIG. 7 is a cut away, top view of a reflector.

FIG. 7 is a cut away, top view of a reflector 702 used by an embodiment of the ACLs 100, 300, 500 and/or 600. That is, the reflector 702 conceptually corresponds to the reflectors 104, 106, 304, 306, and 504. The LED lamps 704 conceptually correspond to the above-described LED lamps 108, 110, 308, 310, and 506.

The curvature of the reflector is such that the light emitted from the reflector is within a predefined output angle α. For example, the angle α may be approximately 110° oriented about a predefined directional axis 706. It is appreciated that the angle α may be configured in accordance with light emission criteria for ACLs as specified under aviation regulations. That is, the received light from the plurality of LED lamps 704 reflected by the reflector 702 is output at a regulated output angle α corresponding to a regulated angle for an ACL.

Figure 8:
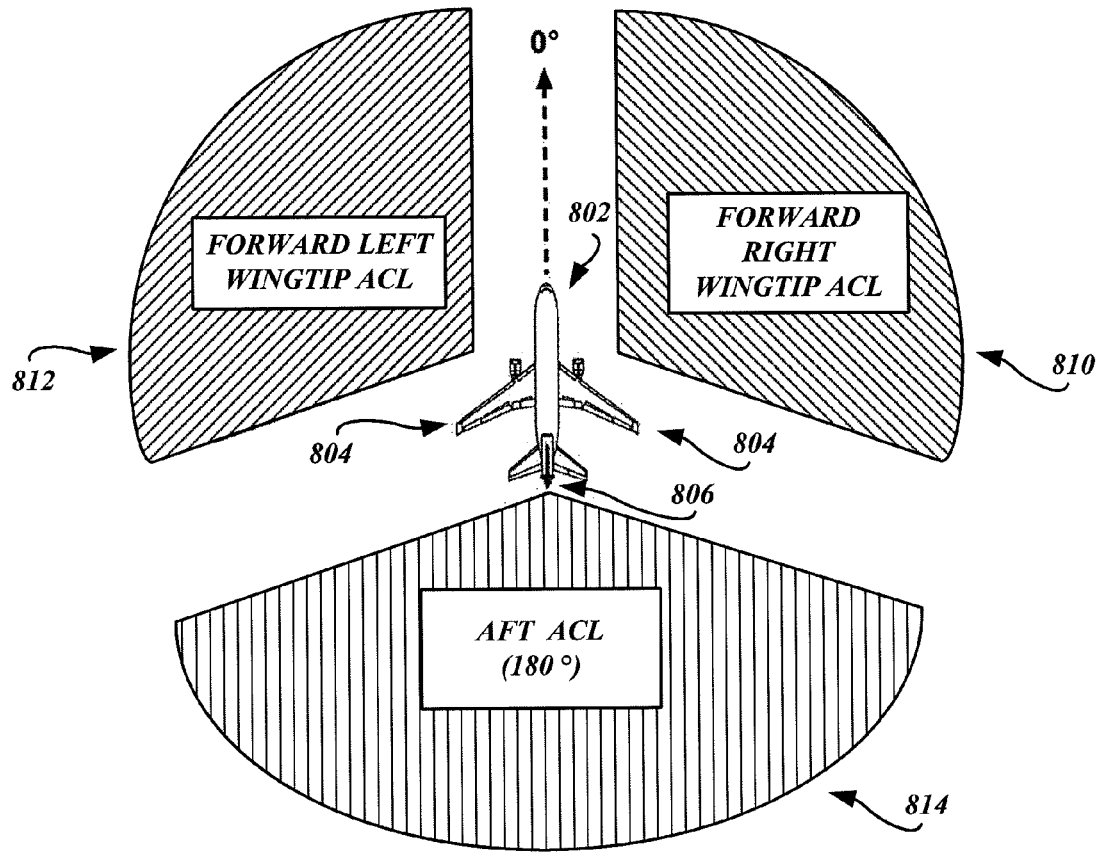
FIG. 8 is a top view of an aircraft indicating exemplary location for embodiment of the LED aircraft ACL.

FIG. 8 is a top view of an aircraft 802 indicating exemplary locations for embodiments of the LED aircraft ACL. The ACLs conceptually correspond to the ACLs 100, 300, 500, and/or 600 described above. Exemplary location of the ACLs include the wing tips 804, the and/or the tail 806 of the aircraft 802. Regions 810 and 812 correspond to visible regions of light emitted by ACLs located at the wingtips 804 of the aircraft 802. Region 814 corresponds to the visible region of light emitted by an ACL, having an angle α corresponding to 180°, located at the tail 806 of the aircraft 802. The ACLs may be located in other selected locations on the aircraft 802 and transmit light out at any suitable angle α.

Different colors and/or types of light may be emitted from ACLs. Commonly used colors of emitted visible light include red and white for an ACL, although any color of visible light may be emitted by alternative embodiments. In some applications, infrared light may be emitted, though light of any frequency may be emitted from the ACLs. Further, a single ACL may be configured to emit different colors of light and/or different types of light at different times by using different types of LED lamps in a common housing. For example, if an ACL is configured to emit white light and infrared, a plurality of LED lamps operable to emit white light and a plurality of LED lamps operable to emit infrared may be placed in the ACL. A suitable controller (not shown) would be used to power the white light LED lamps and the infrared LED lamps at selected times.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An aircraft anti-collision light (ACL) that emits light in a predefined direction, comprising:
    a housing;
    an elongated reflector within the housing, the elongated reflector having a width defining a major axis of an arc along an inside perimeter of the elongated reflector, and having a light output opening opposite the arc of the inside perimeter;
    an elongated support having an arc shaped edge, wherein the arc shaped edge of the elongated support corresponds to and is attached to the arc of the inside perimeter of the elongated reflector, and wherein the arc shaped edge of the elongated support when attached to the elongated reflector is aligned with the major axis along the arc of the inside perimeter; and
    a plurality of light emitting diode (LED) lamps within the housing and arranged in an arc on the elongated support, wherein the arc of the LED lamps corresponds to the arc of the inside perimeter of the elongated reflector, and wherein the LED lamps emit light in a direction substantially perpendicular to the direction of light emitted from the ACL,
    wherein the elongated reflector reflects the light received from the plurality of LED lamps in the direction of light emitted from the light output opening of the ACL.

2. The ACL of claim 1, wherein the plurality of LED lamps comprises:
    a first plurality of LED lamps arranged in a first arc on the elongated support, wherein the arc of the first plurality of LED lamps corresponds to the arc of the inside perimeter of the elongated reflector, and wherein the first plurality of LED lamps emit light in a first direction substantially perpendicular to the direction of light emitted from the light output opening of the ACL;
    a second plurality of LED lamps arranged in a second arc on the elongated support, wherein the arc of the second plurality of LED lamps corresponds to the arc of the inside perimeter of the elongated reflector, and wherein the second plurality of LED lamps emit light in a second direction substantially perpendicular to the direction of light emitted from the light output opening of the ACL;
    wherein the elongated reflector comprises:
    a first reflector portion having a width defining the major axis of the arc along the inside perimeter of the elongated reflector, and having a first light output opening opposite the arc of the inside perimeter of the elongated reflector, wherein the first reflector portion receives light from the first plurality of LED lamps, reflects the received light from the first plurality of LED lamps in the direction of light emitted from the light output opening of the ACL; and
    a second reflector portion having a width defining the major axis of the arc along the inside perimeter of the elongated reflector, and having a second light output opening opposite the arc of the inside perimeter of the elongated reflector, wherein the second reflector portion receives light from the second plurality of LED lamps, and reflects the received light from the second plurality of LED lamps in the direction of light emitted from the light output opening of the ACL,
    wherein the first arc of first plurality of LED lamps corresponds to the arc of the inside perimeter of the elongated reflector, and
    wherein the second arc of second plurality of LED lamps corresponds to the arc of the inside perimeter of the elongated reflector.

3. The ACL of claim 2, wherein the first reflector portion is facing the second reflector portion in the housing, and wherein the light emitted by the first plurality of LED lamps is in a substantially opposite direction from the light emitted by the second plurality of LED lamps.

4. The ACL of claim 3, further comprising:
    a detachable support mounted to the housing, wherein the first plurality of LED lamps are mounted on a first side of the detachable support, and wherein the second plurality of LED lamps are mounted on a second opposing side of the detachable support.

5. The ACL of claim 2, wherein the first plurality of LED lamps are facing away from the second plurality of LED lamps.

6. The ACL of claim 1 wherein the plurality of LED lamps comprises:
    a first plurality of LED lamps operable to emit a first type of light; and
    a second plurality of LED lamps operable to emit a second type of light.

7. The ACL of claim 6 wherein the first plurality of LED lamps emit a visible color of light and the second plurality of LED lamps emit infrared light.

8. The ACL of claim 6 wherein the first plurality of LED lamps emit a visible first color of light and the second plurality of LED lamps emit a visible second color of light.

9. The ACL of claim 1, further comprising:
    a detachable support mounted to the housing, wherein the plurality of LED lamps are mounted on the detachable support.

10. The ACL of claim 1, wherein the plurality of LED lamps emit visible light.

11. The ACL of claim 10, wherein the plurality of LED lamps emit visible light of a selected color.

12. The ACL of claim 1, wherein the plurality of LED lamps are further arranged in a single row corresponding to the perimeter of the elongated reflector.

13. An aircraft anti-collision light (ACL), comprising:
    a light emitting diode (LED) support arranged in an arc and having an arc shaped edge that corresponds to an arc of an inside perimeter of an elongated reflector of an ACL housing, wherein the elongated reflector has a width that defines a major axis along the inside perimeter of the elongated reflector, wherein the arc shaped edge of the LED support is detachably mounted to the ACL housing along the arc of the inside perimeter of the elongated reflector, and wherein the arc shaped edge of the support when attached to the ACL housing is elongated and is aligned with the major axis of the arc of the inside perimeter of the elongated reflector; and
    a plurality of LED lamps mounted on the detachable support and arranged in an arc corresponding to the perimeter of the elongated reflector of the ACL, wherein the LED lamps emit light in a direction substantially perpendicular to the direction of light emitted from an output opening of the ACL, wherein the output opening of the ACL housing is opposite the inside perimeter of the elongated reflector.

14. The ACL of claim 13, wherein the plurality of LED lamps comprise:
   a first plurality of LED lamps mounted on a first side of the detachable support, wherein the first plurality of LED lamps are arranged in a first arc, and wherein the first plurality of LED lamps emit light in a first direction substantially perpendicular to the direction of light emitted from the output opening of the ACL; and
   a second plurality of LED lamps mounted on a second side of the detachable support, wherein the second plurality of LED lamps are arranged in a second arc, and wherein the second plurality of LED lamps emit light in a second direction substantially perpendicular to the direction of light emitted from the output opening of the ACL,
   wherein the second side of the detachable support opposes the first side of the detachable support, and
   wherein first arc of the first plurality of LED lamps and the second arc of the second plurality of LED lamps corresponds to the arc of the inside perimeter of the elongated reflector.

15. The ACL of claim 13, wherein the plurality of LED lamps emit visible light of a selected color.

* * * * *